US008882200B2

(12) United States Patent
Schneider et al.

(10) Patent No.: US 8,882,200 B2
(45) Date of Patent: Nov. 11, 2014

(54) SEAT ASSEMBLY HAVING A SOFT LATCH MECHANISM

(75) Inventors: Joerg-Holger Schneider, Rimsting (DE); Florian Diefenthaler, Allershausen-Leonhardsbuch (DE)

(73) Assignee: Lear Corporation, Southfield, MI (US)

( * ) Notice: Subject to any disclaimer, the term of this patent is extended or adjusted under 35 U.S.C. 154(b) by 66 days.

(21) Appl. No.: 13/390,475

(22) PCT Filed: Sep. 29, 2009

(86) PCT No.: PCT/US2009/058733
§ 371 (c)(1),
(2), (4) Date: Feb. 14, 2012

(87) PCT Pub. No.: WO2011/040903
PCT Pub. Date: Apr. 7, 2011

(65) Prior Publication Data
US 2012/0139320 A1    Jun. 7, 2012

(51) Int. Cl.
*B60N 2/02* (2006.01)
*B60N 2/20* (2006.01)

(52) U.S. Cl.
CPC .................................. *B60N 2/20* (2013.01)
USPC ................................ 297/378.12; 297/378.14

(58) Field of Classification Search
USPC ............................. 297/378.14, 378.12, 378.1
See application file for complete search history.

(56) References Cited

U.S. PATENT DOCUMENTS

| | | | | |
|---|---|---|---|---|
| 3,632,168 A * | 1/1972 | Barello et al. | ........... | 297/378.12 |
| 4,318,569 A | 3/1982 | Bilenchi et al. | | |
| 5,052,748 A * | 10/1991 | Fourrey et al. | ................ | 297/124 |
| 5,265,937 A * | 11/1993 | Allen | ....................... | 297/378.11 |
| 5,573,345 A * | 11/1996 | Voss et al. | ...................... | 403/271 |
| 6,199,951 B1 * | 3/2001 | Zeile et al. | .................... | 297/341 |
| 6,290,297 B1 * | 9/2001 | Yu | ............................. | 297/378.12 |
| 6,540,232 B2 * | 4/2003 | Hansel et al. | ................. | 277/367 |
| 6,870,366 B1 | 3/2005 | Becker et al. | | |
| 6,910,739 B2 * | 6/2005 | Grable et al. | ............ | 297/378.12 |
| 7,300,109 B2 * | 11/2007 | Hofmann et al. | ............. | 297/362 |
| 7,306,286 B2 * | 12/2007 | Syrowik et al. | ........... | 297/378.12 |
| 7,390,061 B2 * | 6/2008 | Lange | .......................... | 297/362 |
| 7,887,134 B2 * | 2/2011 | Shao | ....................... | 297/378.12 |
| 7,922,251 B2 * | 4/2011 | Hayakawa et al. | ........ | 297/378.1 |
| 8,210,614 B2 * | 7/2012 | Shao | ....................... | 297/378.12 |
| 2003/0214167 A1 | 11/2003 | Boehmer et al. | | |
| 2004/0084945 A1 | 5/2004 | Toba et al. | | |
| 2004/0217638 A1 * | 11/2004 | Shao | ....................... | 297/378.14 |
| 2008/0296949 A1 | 12/2008 | Wieclawski | | |
| 2010/0207440 A1 * | 8/2010 | Hayakawa et al. | ...... | 297/378.14 |

FOREIGN PATENT DOCUMENTS

| | | |
|---|---|---|
| CN | 1636791 A | 7/2005 |
| WO | 2008095602 A1 | 8/2008 |

* cited by examiner

*Primary Examiner* — David R Dunn
*Assistant Examiner* — Alexander Harrison
(74) *Attorney, Agent, or Firm* — Brooks Kushman P.C.

(57) ABSTRACT

A seat assembly having a soft latch mechanism. The soft latch mechanism includes a spring arm disposed on a bracket and a housing disposed on a seat back frame. The housing engages an end portion of the spring arm when the seat back frame is in a folded position to inhibit movement of the seat back frame away from the seat bottom frame.

20 Claims, 4 Drawing Sheets

SEAT ASSEMBLY HAVING A SOFT LATCH MECHANISM

CROSS-REFERENCE TO RELATED APPLICATION

This application is a U.S. national phase of PCT Appln. No. PCT/US2009/058733, filed Sep. 29, 2009, the disclosure of which is hereby incorporated by reference in its entirety.

BACKGROUND OF THE INVENTION

Field of the Invention

The present invention relates to a seat assembly having a soft latch mechanism.

SUMMARY OF THE INVENTION

In at least one embodiment a seat assembly is provided. The seat assembly includes a seat bottom frame, a bracket disposed on the seat bottom frame, a seat back frame moveably disposed on the bracket, and a soft latch mechanism. The soft latch mechanism includes a spring arm and a housing. The spring arm is disposed on the bracket and has a generally planar ramp portion and an end portion that extends from an end of the ramp portion. The housing is disposed on the seat back frame or upper recliner bracket. The housing has a protrusion that extends toward the spring arm. The housing engages the end portion when the seat back frame is in a folded position to inhibit movement of the seat back frame away from the seat bottom frame.

In at least one embodiment a seat assembly is provided. The seat assembly includes a bracket fixedly disposed on a seat bottom, a seat back disposed on the bracket and configured to pivot about an axis of rotation, and a soft latch mechanism. The soft latch mechanism includes a housing and a spring arm. The housing is fixedly disposed on the seat back or the bracket. The housing has a protrusion that extends toward the bracket. The spring arm has a mounting portion and a planar ramp portion. The mounting portion is fixedly disposed on the bracket. The ramp portion extends from the mounting portion toward the housing such that the ramp portion is spaced apart from the bracket. The spring arm may be disposed between the bracket and the housing when the seat back is in a seating position. The spring arm may be disposed between the bracket and the protrusion of the housing when the seat back is in a folded position in which the seat back is folded over the seat bottom.

DETAILED DESCRIPTION

Detailed embodiments of the present invention are disclosed herein; however, it is to be understood that the disclosed embodiments are merely exemplary of the invention that may be embodied in various and alternative forms. The figures are not necessarily to scale, some features may be exaggerated or minimized to show details of particular components. Therefore, specific structural and functional details disclosed herein are not to be interpreted as limiting, but merely as a representative basis for the claims and/or as a representative basis for teaching one skilled in the art to variously employ the present invention.

Figure 1:
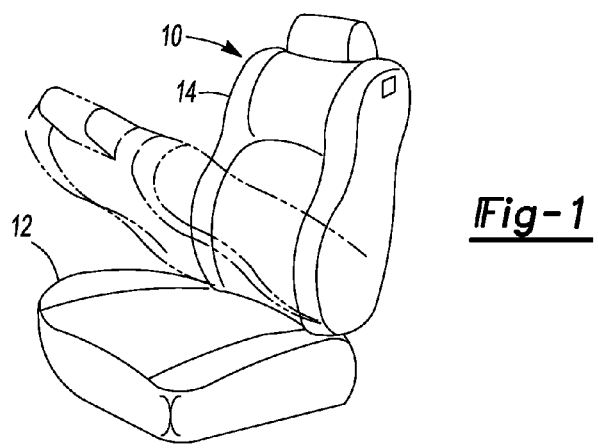
FIG. 1 is a perspective view of a vehicle seat.

Referring to FIG. 1, an exemplary seat assembly 10 is shown. The seat assembly 10 may be configured for use in a motor vehicle, such as a car or truck. The seat assembly 10 includes a seat bottom 12 and a seat back 14.

The seat back 14 may be pivotally mounted on the seat bottom 12. For example, the seat back 14 may be configured to fold or pivot forward (toward the seat bottom 12) or backward from an exemplary upright or seating position shown in solid lines in FIG. 1. An exemplary folded position is shown in phantom in FIG. 1.

Figure 2:
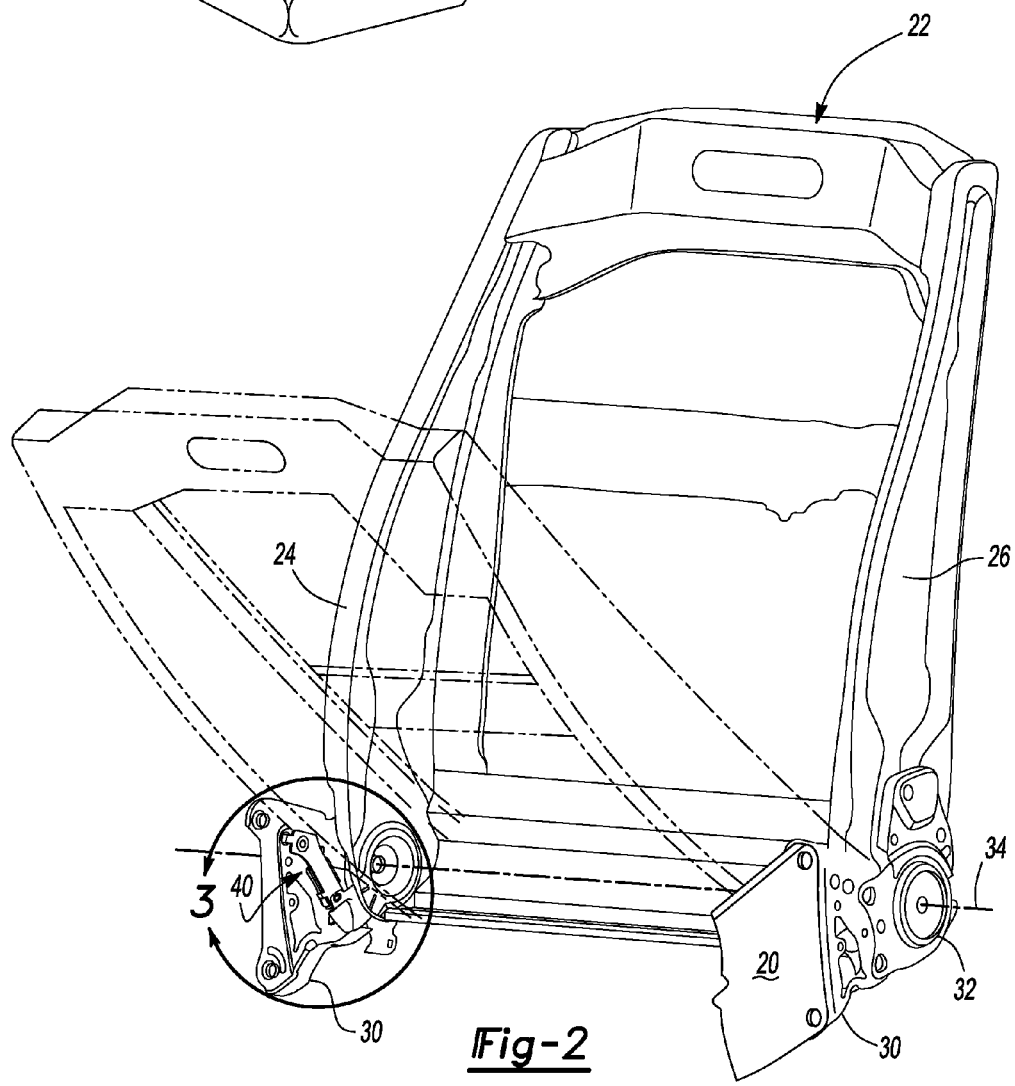
FIG. 2 is a fragmentary perspective view of a portion of a frame of the vehicle seat.

Referring to FIGS. 1 and 2, a seat bottom frame 20 and a seat back frame 22 are shown. The seat bottom and seat back frames 20, 22 may be made of any suitable material, such as a metal alloy. The seat back frame 22 may include first and second side members 24, 26. A bracket 30 may be disposed on each side member 24, 26. More specifically, the bracket 30 may be associated with a recliner mechanism 32, such as a discontinuous recliner mechanism, that selectively enables and disables pivotal movement of the seat back frame 22 with respect to the seat bottom 12. An first end of the bracket 30 may receive the recliner mechanism 32 while a second end disposed generally opposite the first end may be fixedly disposed on the seat bottom frame 20. As such, the recliner mechanism 32 may facilitate rotation or pivoting of the seat back 14 about an axis of rotation 34.

Figure 3:
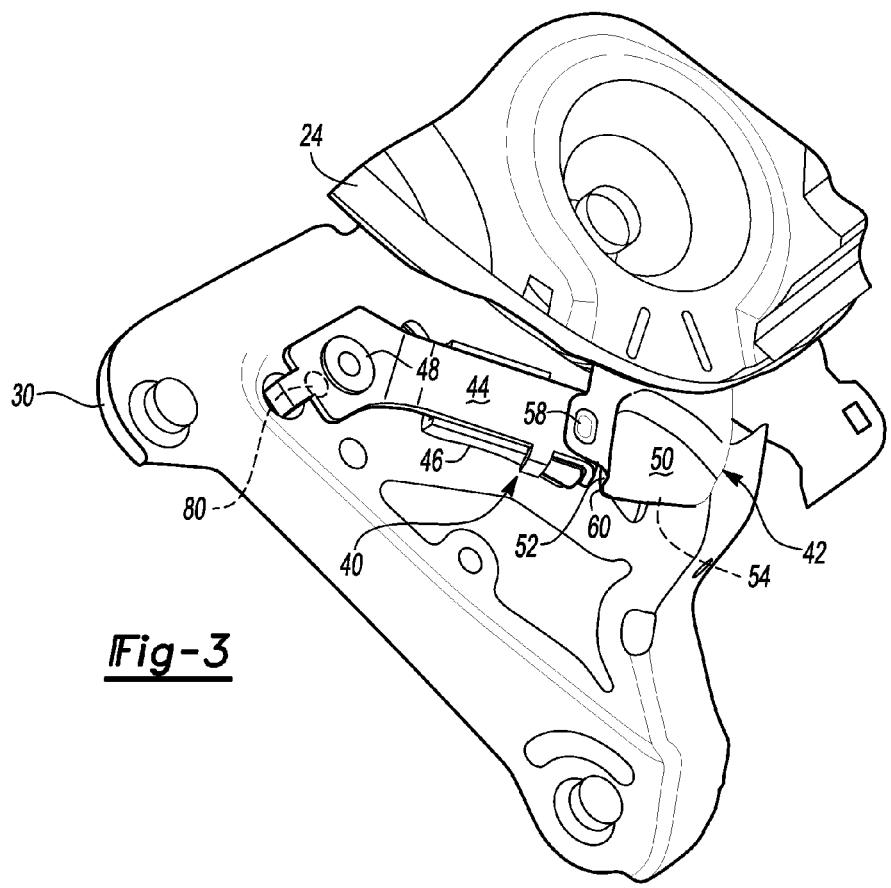
FIG. 3 is a magnified perspective view of the region within circle line 3 of FIG. 2 illustrating a soft latch mechanism.

Referring to FIG. 3, a soft latch mechanism 40 is shown. The soft latch mechanism 40 may be associated with the first side member 24 and/or the second side member 26 and the bracket 30. For simplicity, a soft latch mechanism 40 is shown with the first side member 24 and bracket 30 in FIG. 3. The soft latch mechanism 40 may include a housing 42, a spring arm 44, a cushion 46, and a fastener 48. In addition, a lubricant such as polytetrafluoroethylene (PTFE) may be provided to reduce friction between contacting surfaces of the housing 42 and the spring arm 44.

Figure 4:
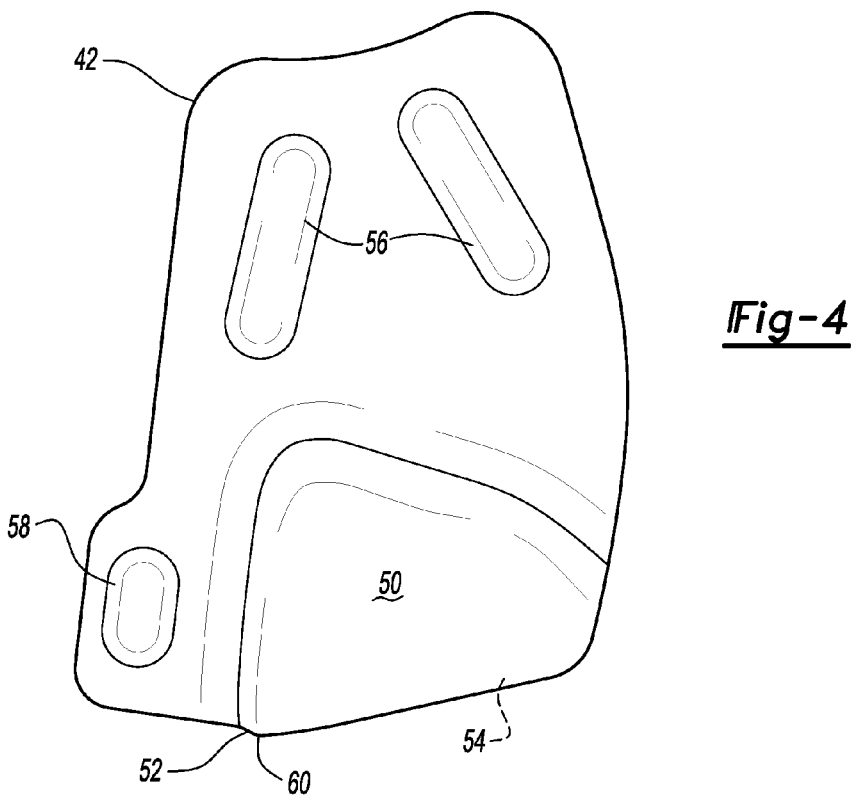
FIG. 4 is a side view of a housing of the soft latch mechanism.

Referring to FIG. 4, a housing 42 is shown in more detail. The housing 42 may be disposed on any suitable support structure, such as first and/or second side members 24, 26 or the upper recliner bracket. A side view of the housing 42 from the inside of the seat assembly 10 is shown in FIG. 4. The housing 42 may include a protrusion 50 having first and second contact surfaces 52, 54, one or more weld bosses 56, and an end protrusion 58. The housing 42 may be made of any suitable material, such as a metal alloy. In addition, the housing 42 may be coated with a material that helps inhibit corrosion between the housing 42 and the spring arm 44. For example, the housing 42 may be coated via cataphoretic dip painting or any suitable electrochemical paint deposition process to provide good corrosion resistance, even coating thickness, and good thermal and mechanical load resistance.

The protrusion 58 may extend toward the bracket 30 to create a generally convex bulge. The first contact surface 52 may be configured with a similar profile as the end of the spring arm 44. More specifically, the first contact surface 52 may extend at an angle from the housing 42 to provide a ramp or angled surface that actuates the spring arm 44 in a controlled manner. The second contact surface 54 may extend at a different angle from the housing 42 than the first contact surface 52. The second contact surface 54 may be configured with a similar profile as a ramp portion of the spring arm 44 as will be discussed in more detail below. A radius or curved surface 60 may be provided between the first and second contact surfaces 52, 54 to facilitate smooth movement of the housing 42 along the spring arm 44.

The weld bosses 56 may facilitate attachment of the housing 42 to the seat back frame 22. More specifically, the housing 42 may be welded to a side member 24, 26 of the seat back frame 22 along the weld bosses 56. Any suitable number of weld bosses may be provided. The weld bosses 56 may be generally linear and may extend radially or at an angle with respect to each other when multiple weld bosses 56 are provided.

The end protrusion 58 may extend from the housing 42 toward the bracket 30. The end protrusion 58 may be disposed along a portion of the housing 42 that is adjacent to the first contact surface 52. The end protrusion 58 may contact a portion of the spring arm 44 to inhibit vibration when the first contact surface 52 is near the end of the spring arm 44 and/or to inhibit buckling of the spring arm 44.

Figure 5:
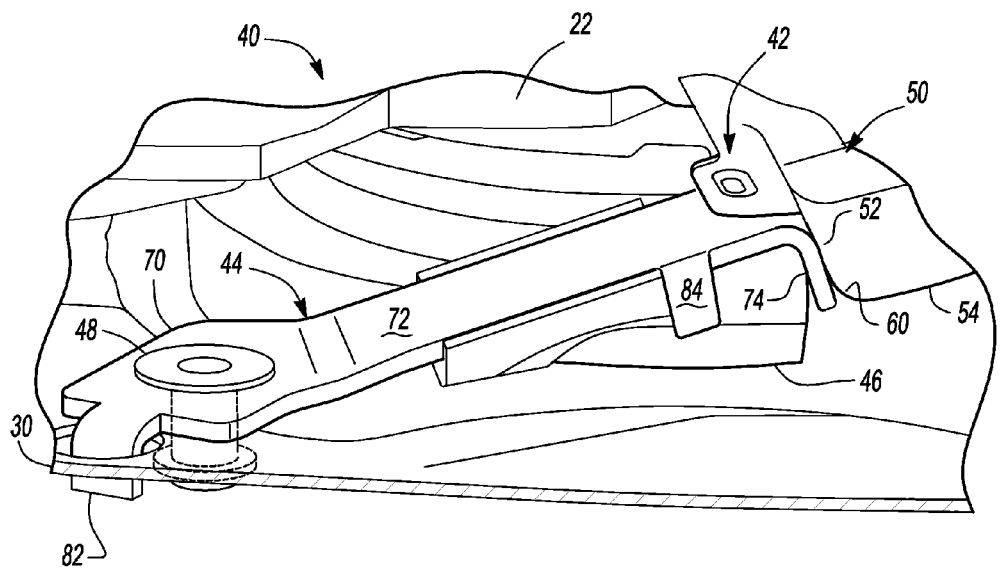
FIGS. 5-7 are a sequence of perspective views illustrating operation of the soft latch mechanism.
Figure 6:
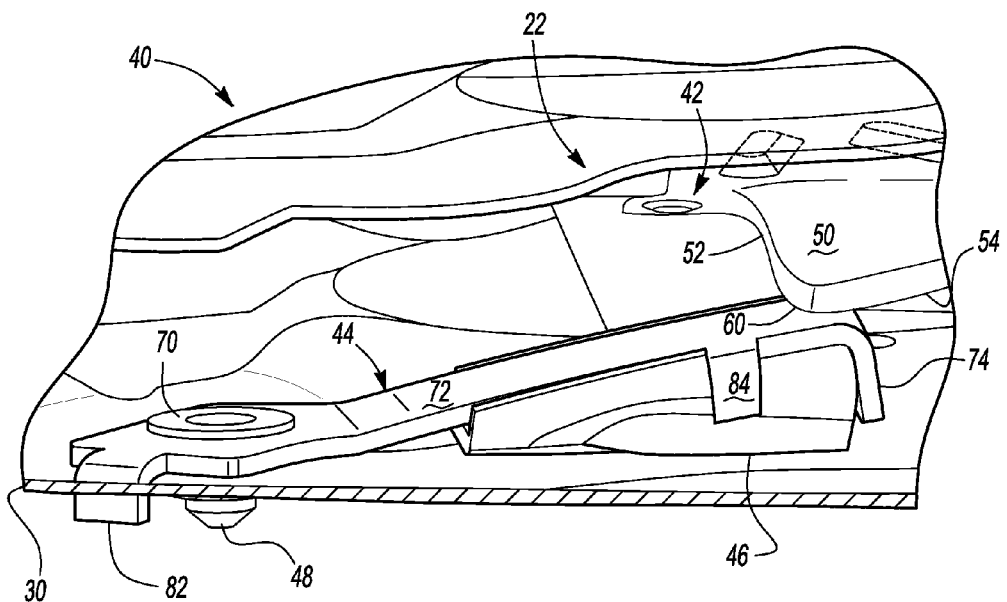
Figure 7:
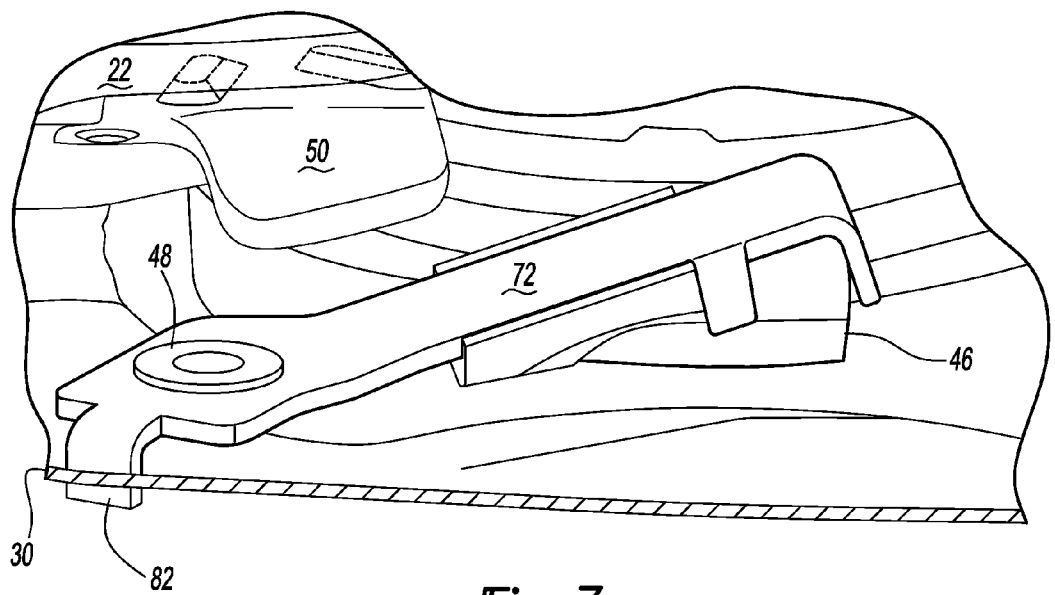

The spring arm 44 may be disposed on the bracket 30. The spring arm 44 may be made of any suitable material, such as a metal alloy like zinc coated steel. As is best shown in FIGS. 5-7, the spring arm 44 may include a mounting portion 70, a ramp portion 72, and an end portion 74.

The mounting portion 70 may be generally planar and may include a mounting hole 80 (shown in FIG. 3) and an orientation tab 82 that extends into a hole in the bracket 30 to help align the spring arm 44 and inhibit rotation. A side of the mounting portion 70 may be in substantially continuous contact with the bracket 30.

The ramp portion 72 may extend from the mounting portion 70. More specifically, the ramp portion 72 may extend from the mounting portion 70 at an angle such that the ramp portion 72 extends away from the bracket 30. The ramp portion 72 may extend along a plane and have a substantially flat surface. The ramp portion 72 may include one or more orientation tabs 84 that are aligned with the cushion 46.

The end portion 74 may extend from an end of the ramp portion 72 that is disposed opposite the mounting portion 70. In at least one embodiment, the end portion 74 may extend at an angle from the ramp portion 72. The end portion 74 may extend toward the bracket 30. The end portion 74 may be spaced apart from the bracket 30 when the spring arm 44 is not biased toward the bracket 30. In addition, the end portion 74 may contact the bracket 30 and act as a stop that provides a maximum point of travel or deflection of the spring arm 44.

The cushion 46 may be disposed between the bracket 30 and the ramp portion 72 of the spring arm 44. The cushion 46 may be made of any suitable material, such as a compressible resilient material like rubber. The cushion 46 may be mounted to the bracket 30 or the spring arm 44 in any suitable manner. In addition, the cushion 46 may include a groove that receives the ramp portion 72 of the spring arm 44. The cushion 46 may help inhibit rattling or vibration of the spring arm 44 and inhibit noise.

The fastener 48 may facilitate attachment of the spring arm 44 to the bracket 30. The fastener may be of any suitable type, such as a mechanical fastener like a rivet. The fastener may extend through the mounting hole 80 in the spring arm 44 and into a corresponding hole in the bracket 30.

Operation of the soft latch mechanism 30 will now be described. Starting with the seat back 14 in a folded position as shown in FIGS. 1 and 2, the protrusion 50 of the housing 42 may be located proximate the end portion 74 of the spring arm 44 as shown in FIG. 5. As such, the housing 42 and spring arm 44 cooperate to inhibit movement of the seat back 14 toward an upright position.

The first contact surface 52 slides along the end portion 74 and actuates the spring arm 44 toward the bracket 30 when sufficient force is applied to the seat back 14 in a predetermined direction, such as in a direction of seat travel along a seat mounting track. Actuation of the spring arm 44 compresses the cushion 46 toward the bracket 30. Moreover, the end portion 74 may orient itself to be substantially parallel (e.g., within approximately five degrees) to the first contact surface 52 upon engagement. The force exerted by the spring arm 44 may also cause the first side member 24 and/or the bracket 30 to move or twist. For instance the first side member 24 may twist generally away from the spring arm 44 when sufficient force is applied.

Referring to FIG. 6, when the spring arm 44 is sufficiently compressed, the curved surface 60 and subsequently the second contact surface 54 of the housing 42 slide along the ramp portion 72 of the spring arm 44. Moreover, the second contact surface 54 may be substantially parallel (e.g., within approximately five degrees) to the ramp portion 72 at its end position or maximum deflection. As the housing 42 moves down the ramp portion 72, the spring arm 44 progressively moves away from the housing 42 and the cushion 46 decompresses. The housing 42 may disengage or be spaced apart from the spring arm 44 when the seat back 14 is sufficiently actuated away from the folded position and toward the seating position or toward a reclined position as illustrated in FIG. 7. Movement of the seat back 14 toward the folded position may be achieved in a reverse sequence.

Figure 8:
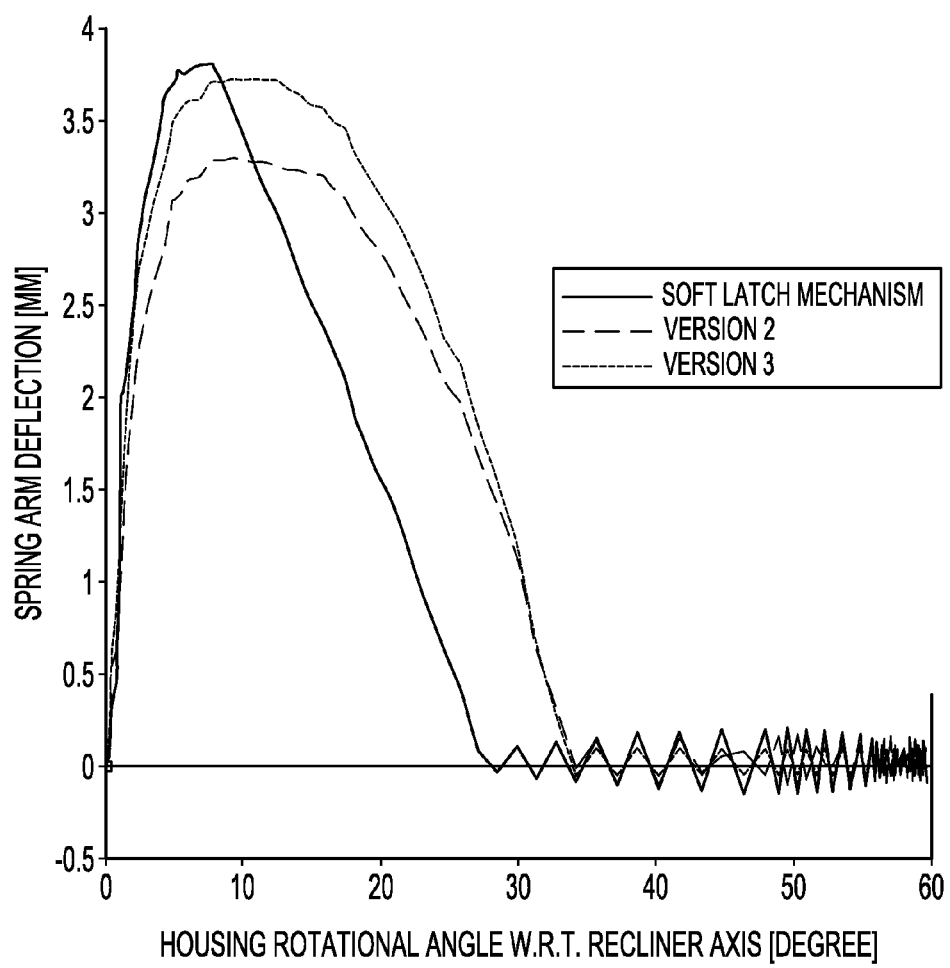
FIG. 8 is a plot comparing spring arm deflection of the soft latch mechanism and that of other designs.

Referring to FIG. 8, a plot illustrating spring arm deflection with respect to rotational angle is shown for three different soft latch mechanisms. The solid line represents the soft latch mechanism of the present invention. The dashed and dotted lines represent second and third embodiments that have spring arms and housings with different configurations from the present invention. More specifically, the second and third embodiments have spring arms with curved (convex) ramp portions and housings that have protrusions that have a less steep first contact surface and a smaller area of contact with the spring arm. Spring deflections near zero (e.g., deflections of less than 0.25 mm) represent vibration or noise. As shown in the plot, the spring arm is deflected over less than 30 degrees for the present invention as compared with approximately 35 degrees for the other two embodiments. As such, the present invention reduces the angle over which there is contact between the spring arm and the housing. The reduced angle of contact reduces the range of motion over which wear and microwelding can occur between the housing and the spring arm, thereby improving operational performance.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:
1. A seat assembly comprising:
a seat bottom frame;
a bracket fixedly disposed on the seat bottom frame such that the bracket does not rotate with respect to the seat bottom frame;
a seat back frame moveably disposed on the bracket; and
a soft latch mechanism including:

a spring arm disposed on the bracket, the spring arm having a generally planar ramp portion and an end portion that extends from an end of the ramp portion; and a housing disposed on the seat back frame or the bracket and having a protrusion that extends toward the spring arm; and a cushion disposed between the ramp portion and the bracket;

wherein the housing engages the end portion when the seat back frame is in a folded position to inhibit movement of the seat back frame away from the seat bottom frame.

2. The seat assembly of claim 1 wherein the cushion is disposed proximate the end portion and the ramp portion.

3. The seat assembly of claim 1 wherein the end portion is spaced apart from the housing.

4. The seat assembly of claim 1 wherein the protrusion includes a first contact surface configured to engage the end portion, wherein the first contact surface is substantially parallel to the end portion during engagement.

5. The seat assembly of claim 4 wherein the housing and seat back frame twist when the housing and spring arm are engaged.

6. The seat assembly of claim 5 further comprising a curved surface disposed between the first contact surface and a second contact surface that extends from the first contact surface.

7. The seat assembly of claim 6 wherein the first and second contact surfaces extend from the curved surface and away from the bracket at different angles.

8. The seat assembly of claim 1 wherein the spring arm is actuated by the housing over less than a 30 degree angle of rotation of the seat back frame to inhibit microwelding.

9. The seat assembly of claim 1 wherein a reaction force between the housing and the spring arm declines continuously when the seat back frame is moved toward a seating position.

10. The seat assembly of claim 1 wherein the spring arm does not rotate with respect to the bracket.

11. A seat assembly comprising:
a seat bottom;
a bracket fixedly disposed on the seat bottom;
a seat back configured to pivot about an axis of rotation with respect to the seat bottom; and
a soft latch mechanism including:

a housing fixedly disposed on the bracket and having a protrusion; and a spring arm that is moveably disposed with respect to the housing, the spring arm having a mounting portion, a ramp portion that extends from the mounting portion toward the housing, and an end portion that extends from the ramp portion; and a cushion disposed adjacent to the spring arm such that the ramp portion of the spring arm is disposed between the cushion and the housing;

wherein the end portion engages the housing before the ramp portion engages the housing when the seat back is moved from a folded position toward a seating position.

12. The seat assembly of claim 11 wherein the protrusion engages the ramp portion as the seat back is moved from the folded position toward the seating position.

13. The seat assembly of claim 11 wherein the cushion is disposed proximate the end portion and engages the ramp portion.

14. The seat assembly of claim 11 wherein the ramp portion engages the protrusion before the end portion engages the protrusion when the seat back is moved from the seating position toward the folded position.

15. The seat assembly of claim 11 wherein the housing and spring arm cooperate to inhibit movement of the seat back from the folded position to the seating position when sufficient force is not applied to the seat back to move the ramp portion toward the bracket.

16. The seat assembly of claim 11 wherein the housing further comprises a weld boss that facilitates attachment of the housing.

17. The seat assembly of claim 11 wherein the housing is disposed on a side member of the seat back and wherein the side member and housing move in response to force exerted by the spring arm upon the housing.

18. The seat assembly of claim 11 wherein the ramp portion extends in a substantially linear direction.

19. The seat assembly of claim 11 wherein the spring arm is actuated by the housing over an angle of rotation of the seat back that is less than 30 degrees.

20. The seat assembly of claim 11 wherein the spring arm does not rotate with respect to the bracket.

* * * * *